(12) United States Patent
Koga et al.

(10) Patent No.: US 12,134,546 B2
(45) Date of Patent: Nov. 5, 2024

(54) GANTRY DRIVE SYSTEM, MOTOR CONTROL SYSTEM, AND CONTROL METHOD

(71) Applicant: KABUSHIKI KAISHA YASKAWA DENKI, Fukuoka (JP)

(72) Inventors: Minoru Koga, Fukuoka (JP); Shota Kawahara, Fukuoka (JP); Junichi Ito, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 49 days.

(21) Appl. No.: 17/865,816

(22) Filed: Jul. 15, 2022

(65) Prior Publication Data

US 2022/0411236 A1    Dec. 29, 2022

(51) Int. Cl.
*B66C 13/30* (2006.01)
*B66C 13/46* (2006.01)
*H02P 6/16* (2016.01)

(52) U.S. Cl.
CPC .............. *B66C 13/30* (2013.01); *B66C 13/46* (2013.01)

(58) Field of Classification Search
CPC ............ B66C 13/30; B66C 13/46; H02P 6/16
See application file for complete search history.

(56) References Cited

U.S. PATENT DOCUMENTS

| 6,584,367 B1 * | 6/2003 | Makino | G05B 19/195 700/60 |
| 6,927,838 B2 * | 8/2005 | Ono | G03F 7/70725 318/560 |
| 7,372,231 B2 * | 5/2008 | Sako | G05B 19/19 318/632 |
| 9,579,763 B2 * | 2/2017 | Hosaka | B23Q 16/00 |

FOREIGN PATENT DOCUMENTS

| JP | 2005-332191 A | 12/2005 |
| JP | 4391883 B1 | 12/2009 |
| JP | 6143989 B1 | 6/2017 |

* cited by examiner

*Primary Examiner* — Thai T Dinh
(74) *Attorney, Agent, or Firm* — Venjuris, P.C.

(57) ABSTRACT

A gantry drive system includes: a first motor configured to drive a driving object along a first axis; a second motor configured to drive the driving object along a second axis parallel with the first axis; and a motor control system configured to control the first and second motors. The motor control system includes a mode switch that performs a switching between a first control mode in which a position of the driving object on each of the first and second axes is individually controlled while reducing an inter-axis positional deviation between the first and second axes, and a second control mode in which a rotational state of the driving object is controlled while controlling a position of the driving object, based on detected positions of the driving object on the first and second axes.

14 Claims, 10 Drawing Sheets

GANTRY DRIVE SYSTEM, MOTOR CONTROL SYSTEM, AND CONTROL METHOD

CROSS-REFERENCE TO RELATED APPLICATIONS

This application is based on and claims priority from Japanese Patent Application No. 2021-124470, filed on Jul. 29, 2021, with the Japan Patent Office, the disclosure of which is incorporated herein in its entirety by reference.

TECHNICAL FIELD

The present disclosure relates to a gantry drive system, a motor control system, a control method, and a control program.

BACKGROUND

Japanese Patent Laid-Open Publication No. 2005-332191 discloses a control device which controls a pair of drive means that drives the vicinities of both ends of a moving body based on detection signals from a pair of position detectors that detects moving positions of the vicinities of both ends of the moving body.

SUMMARY

According to an aspect of the present disclosure, a gantry drive system includes: a first motor configured to drive a driving object along a first axis; a second motor configured to drive the driving object along a second axis parallel with the first axis; and a motor control system configured to control the first and second motors. The motor control system includes a mode switch that performs a switching between a first control mode in which a position of the driving object on each of the first and second axes is individually controlled while reducing an inter-axis positional deviation between the first and second axes, which is a deviation between the position of the driving object on the first axis and the position of the driving object on the second axis, and a second control mode in which a rotational state of the driving object is controlled while controlling a position of the driving object, based on detected positions of the driving object on the first and second axes. The motor control system controls the first and second motors according to the control modes switched by the mode switch.

According to another aspect of the present disclosure, a motor control system includes: a controller configured to control a first motor that drives a driving object along a first axis, and a second motor that drives the driving object along a second axis parallel with the first axis; and a mode switch configured to perform a switching between a first control mode in which a position of the driving object on each of the first and second axes is individually controlled while reducing an inter-axis positional deviation between the first and second axes, which is a deviation between the position of the driving object on the first axis and the position of the driving object on the second axis, and a second control mode in which a rotational state of the driving object is controlled while controlling a position of the driving object, based on detected positions of the driving object on the first and second axes. The controller controls the first and second motors according to the control modes switched by the mode switch.

According to yet another aspect of the present disclosure, a control method includes: controlling a first motor that drives a driving object along a first axis, and a second motor that drives the driving object along a second axis parallel with the first axis; and performing a switching between a first control mode in which a position of the driving object on each of the first and second axes is individually controlled while reducing an inter-axis positional deviation between the first and second axes, which is a deviation between the position of the driving object on the first axis and the position of the driving object on the second axis, and a second control mode in which a rotational state of the driving object is controlled while controlling a position of the driving object, based on detected positions of the driving object on the first and second axes. The controlling the first and second motors includes controlling the first and second motors according to a switched control mode.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
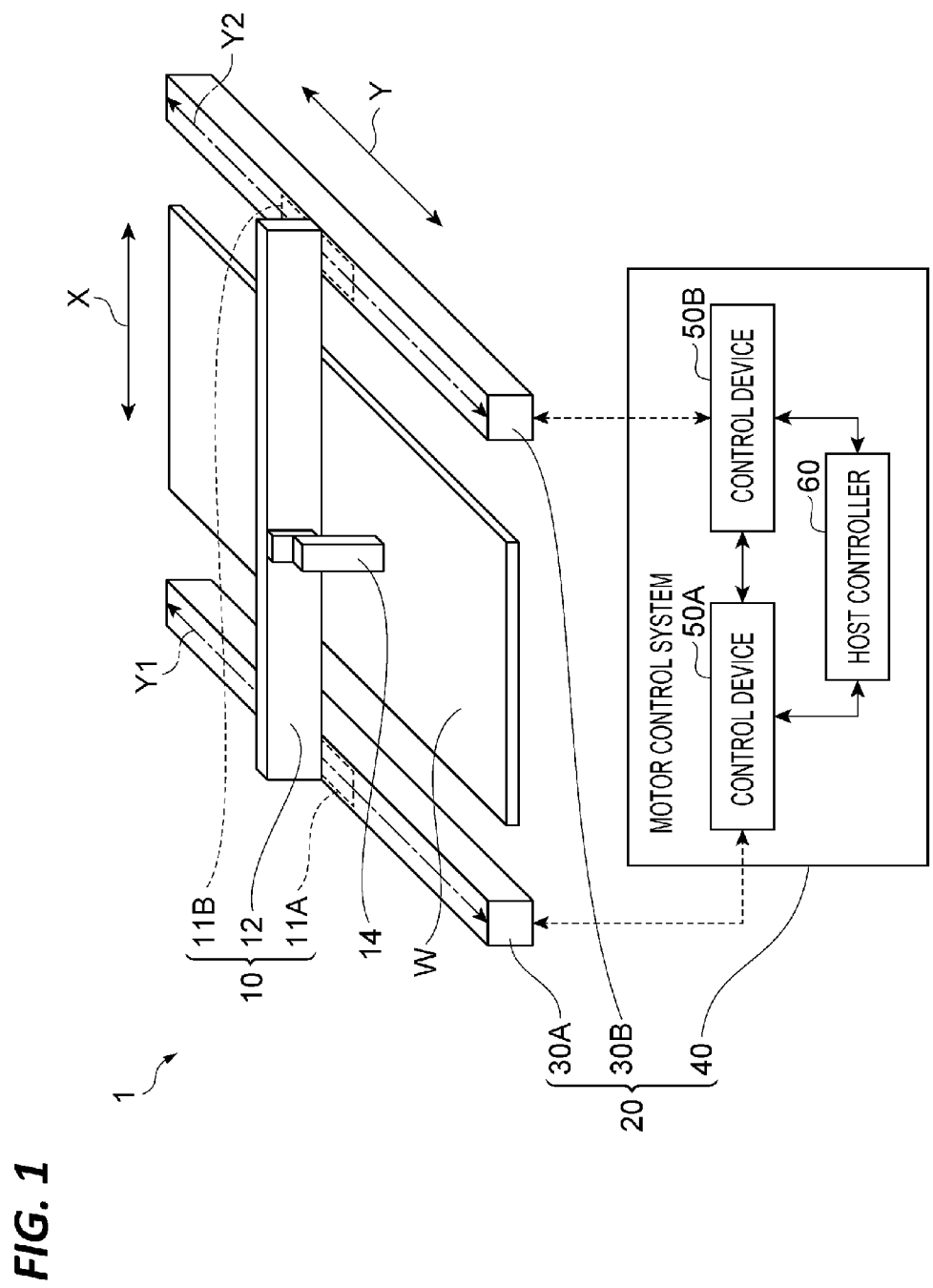
FIG. 1 is a schematic view illustrating an example of a gantry drive system.

In the following detailed description, reference is made to the accompanying drawings which form a part hereof. The illustrative embodiments described in the detailed description, drawings, and claims are not meant to be limiting. Other embodiments may be utilized, and other changes may be made without departing from the spirit or scope of the subject matter presented herein.

Hereinafter, an embodiment will be described with reference to the drawings. In the descriptions, the same components or components having the same function will be denoted by the same reference numerals, and overlapping descriptions thereof will be omitted.

FIG. 1 schematically illustrates a gantry drive system according to an embodiment. A gantry drive system 1 automatically executes at least a portion of a predetermined work. Specific examples of the predetermined work that is executed by the gantry drive system 1 include mounting a semiconductor component on a substrate, soldering a semiconductor component to a substrate, a coating work, and manufacturing a semiconductor or a liquid crystal display. The gantry drive system 1 includes a gantry mechanism 10, a work tool 14, and a drive system 20.

The gantry mechanism 10 is a target (e.g., a driving object) which is driven by the drive system 20. The gantry mechanism 10 is disposed, for example, above a work W, and configured to move (e.g., drive) in a predetermined direction above the work W. The gantry mechanism 10 may be movable in one direction or in two directions intersecting each other (e.g., two directions perpendicular to each other). FIG. 1 illustrates the gantry mechanism 10 movable in one direction. Hereinafter, one direction in which the gantry mechanism 10 moves will be referred to as a Y-axis direction, and the direction perpendicular to the Y-axis direction will be referred to as an X-axis direction. Each of the X-axis and Y-axis directions may be horizontal.

In the gantry mechanism 10, both ends thereof perpendicular to the moving direction are individually driven. When driving forces along two parallel axes (two parallel lines) are applied to both ends of the gantry mechanism 10, the gantry mechanism 10 reciprocates along the Y-axis direction. Hereinafter, one of the two parallel axes (two lines) will be referred to as a "Y1 axis," and the other axis will be referred to as a "Y2 axis." The gantry mechanism 10 includes, for example, movable portions 11A and 11B and a mechanical connector 12.

The movable portion 11A is a portion (e.g., a slider) movable along the Y1 axis by the driving force applied along the Y1 axis. The movable portion 11B is a portion (e.g., a slider) movable along the Y2 axis by the driving force applied along the Y2 axis. The gantry mechanism 10 may include a guide member (not illustrated) such as, for example, a rail for guiding the movable portion 11A along the Y1 axis, and a guide member (not illustrated) such as, for example, a rail for guiding the movable portion 11B along the Y2 axis.

The mechanical connector 12 mechanically connects the Y1 and Y2 axes to each other. The mechanical connector 12 is formed in a rod shape that extends along the X-axis direction. One end of the mechanical connector 12 in the X-axis direction is connected to the movable portion 11A, and the other end of the mechanical connector 12 in the X-axis direction is connected to the movable portion 11B. The length of the mechanical connector 12 in the X-axis direction is longer than the length of the work W which is a work target, in the X-axis direction. The cross section of the mechanical connector 12 that is vertical to the X-axis direction may have a quadrilateral shape (e.g., a rectangular shape). Driving forces are applied to both ends of the mechanical connector 12, respectively, via the movable portions 11A and 11B along the lines parallel to the Y-axis direction.

The work tool 14 is provided to perform the predetermined work on the work W. The work tool 14 may be provided on the side surface of substantially the center of the mechanical connector 12 in the X-axis direction. Unlike the example illustrated in FIG. 1, the gantry mechanism 10 may include a mechanism that drives (e.g., reciprocates) the work tool 14 along the X-axis direction. The mechanism that drives the work tool 14 along the X-axis direction may be provided in the mechanical connector 12. The gantry mechanism 10 may include a mechanism that drives (e.g., reciprocates) the work tool 14 along the direction perpendicular to the X-axis direction and the Y-axis direction.

[Gantry Drive System]

The drive system 20 drives the gantry mechanism 10. For example, the drive system 20 applies driving forces to the Y1 and Y2 axes, respectively, in the gantry mechanism 10 to move the gantry mechanism 10 (e.g., the movable portions thereof) along the Y-axis direction. The drive system 20 includes motors 30A and 30B, and a motor control system 40.

(Motors)

The motor 30A (e.g., a first motor) drives the gantry mechanism 10 along the Y1 axis (e.g., a first axis). The motor 30A is configured to apply a driving force to one end of the mechanical connector 12 of the gantry mechanism 10 in the X-axis direction. The motor 30A is, for example, a linear motor, and is formed such that the most part thereof extends along the Y1 axis. The lower surface of one end of the mechanical connector 12 is connected to the motor 30A via the movable portion 11A. The motor 30A reciprocates the movable portion 11A along the Y1 axis. On the Y1 axis, the position of one end of the mechanical connector 12 correlates with the position of the movable portion 11A.

The motor 30B (e.g., a second motor) drives the gantry mechanism 10 along the Y2 axis (e.g., a second axis). The motor 30B is configured to apply a driving force to the other end of the mechanical connector 12 of the gantry mechanism 10 in the X-axis direction. The motor 30B is, for example, a linear motor, and is formed such that the most part thereof extends along the Y2 axis. The lower surface of the other end of the mechanical connector 12 is connected to the motor 30B via the movable portion 11B. The motor 30B reciprocates the movable portion 11B along the Y2 axis. On the Y2 axis, the position of the other end of the mechanical connector 12 correlates with the position of the movable portion 11B.

The motors 30A and 30B may be the same type of motors having the same configuration. Each of the motors 30A and 30B may include an electric driving source that generates a driving force, and a position detector that detects the position of each end of the mechanical connector 12 which is the driving object, in the Y-axis direction. The position detector is, for example, a linear scale. The motors 30A and 30B may generate a driving force in a rotation direction around a rotation axis. In this case, the gantry mechanism 10 may include a mechanism that converts the energy of the motor 30A in the rotation direction into the motion along the Y1 axis (e.g., a ball screw mechanism), and may include a mechanism that converts the energy of the motor 30B in the rotation direction into the motion along the Y2 axis.

(Motor Control System)

The motor control system 40 controls the motors 30A and 30B. The motor control system 40 is configured with, for example, a plurality of computer devices. The motor control system 40 may control the motors 30A and 30B according to a predetermined operation program. The motor control system 40 is configured to be able to switch its control modes (operation modes). The control modes include an inter-axis compensation control mode (e.g., a first control mode) and a separation control mode (e.g., a second control mode). The motor control system 40 controls the motors 30A and 30B according to a switched control mode.

In the inter-axis compensation control mode, the motor control system 40 controls the motors 30A and 30B to individually control the positions of the mechanical connector 12 on the Y1 and Y2 axes, respectively (e.g., the respective positions of both ends thereof), while reducing an inter-axis positional deviation between the Y1 and Y2 axes. The inter-axis positional deviation refers to a deviation between a detected position of the mechanical connector 12 on the Y1 axis and a detected position of the mechanical connector 12 on the Y2 axis, and will be hereinafter referred to as an "inter-axis deviation Δy." The motor control system 40 attempts to move the respective positions of both ends of the mechanical connector 12 to the same target position at the same timing. However, the inter-axis deviation Δy may occur due to, for example, an individual difference of each of the motors 30A and 30B, the parts included in the motors 30A and 30B, and an assembly accuracy of the position detector such as a linear scale.

In individually controlling the positions of the mechanical connector 12, the motor control system 40 controls the motor 30A such that the detected position of the mechanical connector 12 on the Y1 axis approaches the target position, and controls the motor 30B such that the detected position of the mechanical connector 12 on the Y2 axis approaches the target position. In each position control, a compensation (e.g., a correction) is performed to reduce the inter-axis deviation Δy.

In the separation control mode, the motor control system 40 controls the motors 30A and 30B to control the position of the mechanical connector 12 and control the rotational state of the mechanical connector 12, based on the detected position of the mechanical connector 12 on the Y1 axis and the detected position of the mechanical connector 12 on the Y2 axis. The separation control mode is different from the inter-axis compensation control mode in that the separation control mode collectively controls the driving forces (e.g., driving amounts) on the Y1 and Y2 axes. In the separation control mode, the motor control system 40 controls the motors 30A and 30B by separating the position of the mechanical connector 12 in a translational direction (e.g., a Y-axis direction) and the rotational state of the mechanical connector 12 (e.g., an angle in the rotation direction).

Figure 2:
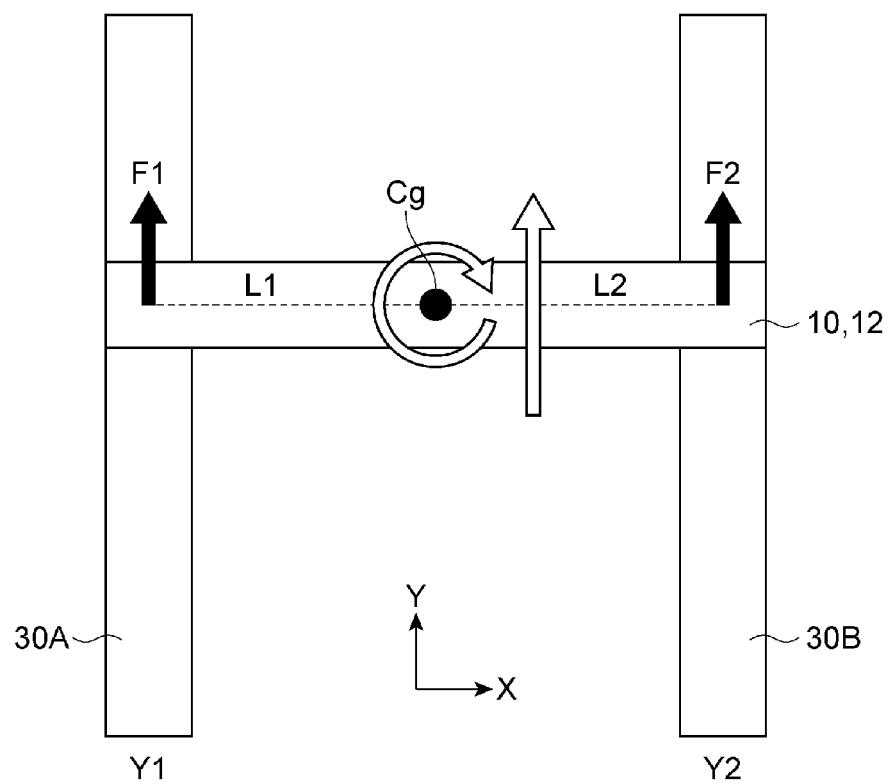
FIG. 2 is a schematic view illustrating a motion equation of a gantry mechanism.

FIG. 2 is a schematic view illustrating a control of the position of the mechanical connector 12 in the translational direction and a control of the rotational state of the mechanical connector 12. In FIG. 2, "Cg" indicates the center of gravity of the mechanical connector 12 in the X-Y plane, "L1" indicates the distance between the center of gravity Cg and the position to which a driving force F1 from the motor 30A is applied, and "L2" indicates the distance between the center of gravity Cg and the position to which a driving force F2 from the motor 30B is applied. When "M" refers to the weight of the mechanical connector 12, and "Jz" refers to the inertia generated in the mechanical connector 12 around the axis vertical to the X-Y plane and passing through the center of gravity Cg, the motion equation at the center of gravity Cg is represented by Equations (1) and (2) below.

$$M \cdot \ddot{Y}g = F1 + F2 \quad (1)$$

$$J_z \cdot \ddot{\theta} = F1 \cdot L1 - F2 \cdot L2 \quad (2)$$

Equation (1) is a motion equation relating to the translational direction of the mechanical connector 12, and Equation (2) is a motion equation relating to the rotation direction of the mechanical connector 12. In Equation (1), "Yg" is calculated by Equation (3) below, and indicates the position of the center of gravity Cg in the Y-axis direction. In Equation (3), "y1" indicates the detected position of the mechanical connector 12 on the Y1 axis which is obtained from the motor 30A, and "y2" indicates the detected position of the mechanical connector 12 on the Y2 axis which is obtained from the motor 30B.

$$Yg = \frac{y1 + y2}{2} \quad (3)$$

In Equation (2), "θ" indicates a rotation angle of the mechanical connector 12 around the center of gravity Cg, and is calculated by Equation (4). The reference of the rotation angle θ is the line extending in the X-axis direction. That is, when a value of the detected position y1 and a value of the detected position y2 match each other, the rotation angle θ is zero. While a deviation may occur between the detected position on the Y1 axis and the detected position on the Y2 axis, the value of the rotation angle θ may be small in many cases due to the mechanical connection. Thus, Equation (4) may be approximated as the following equation (5).

$$\theta = \tan^{-1} \frac{y1 - y2}{L1 + L2} \quad (4)$$

$$\theta \cong \frac{y1 - y2}{L1 + L2} \quad (5)$$

In the separation control mode, the motor control system 40 may control the motors 30A and 30B such that the position Yg represented by Equation (3) follows a target position, and may control the motors 30A and 30B such that the rotation angle θ represented by Equation (5) approaches zero. Details of the inter-axis compensation control mode and the separation control mode will be described later.

Referring back to FIG. 1, the motor control system 40 may include control devices 50A and 50B, and a host controller 60. The control device 50A (e.g., a first control device) is connected to the motor 30A. The control device 50A may adjust the driving force (driving amount) applied from the motor 30A to the mechanical connector 12. The control device 50B (e.g., a second control device) is connected to the motor 30B. The control device 50B may adjust the driving force (e.g., a driving amount) applied from the motor 30B to the mechanical connector 12. Each of the control devices 50A and 50B will also be referred to as an amplifier or a servo amplifier.

The control devices 50A and 50B are connected to each other for a communication. The control devices 50A and 50B make up a control unit that controls the motors 30A and 30B. The control devices 50A and 50B control the motors 30A and 30B in synchronization with each other. The control devices 50A and 50B control the motors 30A and 30B such that the mechanical connector 12 of the gantry mechanism 10 follows the target position. The control devices 50A and 50B control the motors 30A and 30B such that the mechanical connector 12 approaches the target position, and the inter-axis deviation Δy is reduced, every predetermined period. The cooperating method of the control devices 50A and 50B and the method of controlling each motor may vary according to the control mode of the motor control system 40.

The host controller 60 is a host device connected to each of the control devices 50A and 50B for a communication. The host controller 60 outputs a position command indicating the target position of the gantry mechanism 10 which is the driving object, to both control devices 50A and 50B or at least one of the control devices 50A and 50B. When the position command is output to both control devices 50A and 50B, the host controller 60 outputs the position command indicating the same target position to each of the control devices 50A and 50B at the same timing (e.g., in the same period).

For example, the control devices 50A and 50B and the host controller 60 are configured as separate bodies. In the inter-axis compensation control mode, the control device 50A generates a command directed to the motor 30A based on the detected position y1 on the Y1 axis, and the control device 50B generates a command directed to the motor 30B based on the detected position y2 on the Y2 axis. Further, in the inter-axis compensation control mode, at least one of the control devices 50A and 50B generates (calculates) compensation values for the commands directed to the motors 30A and 30B based on the inter-axis deviation Δy. For example, the control device 50A generates a compensation value for the command directed to the motor 30A based on the inter-axis deviation Δy, and the control device 50B generates a compensation value for the command directed to the motor 30B based on the inter-axis deviation Δy.

In the separation control mode, the control device 50A generates commands directed to the motors 30A and 30B based on the detected positions y1 and y2, and the control device 50B generates commands directed to the motors 30A and 30B based on the inter-axis deviation Δy. Hereinafter, an example of each of the control devices 50A and 50B and the host controller 60 will be described in detail.

Figure 3:
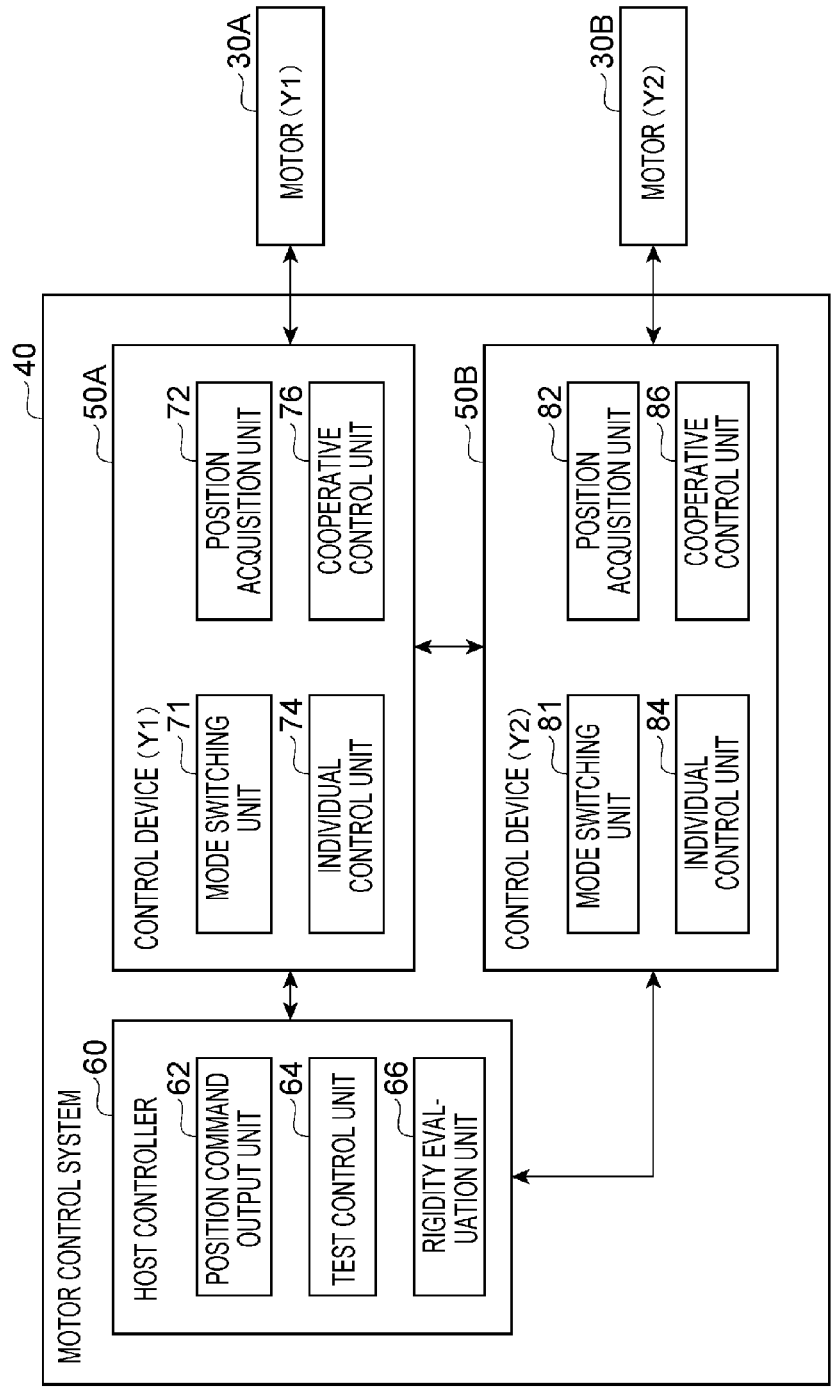
FIG. 3 is a block diagram illustrating an example of a functional configuration of a motor control system.

The control device 50A adjusts the driving amount applied from the motor 30A to the mechanical connector 12 based on the position command from the host controller 60. As illustrated in FIG. 3, the control device 50A includes, for example, a mode switching unit 71, a position acquisition unit 72, an individual control unit 74, and a cooperative control unit 76, as functional components (hereinafter, referred to as "functional modules"). The processes executed by the respective functional modules correspond to the processes executed by the control device 50A.

The mode switching unit 71 performs a switching between the inter-axis compensation control mode and the separation control mode. For the operation mode of the control device 50A, the mode switching unit 71 selects either the inter-axis compensation control mode or the separation control mode. The control device 50A adjusts the driving force applied from the motor 30A to the mechanical connector 12 according to the control mode switched (e.g., selected) by the mode switching unit 71. The mode switching unit 71 performs a switching to one of the control modes based on, for example, a command indicating the control mode from the host controller 60.

The magnitude of the occurring inter-axis deviation Δy (e.g., a twist) and the magnitude of an allowable control gain vary due to the rigidity of the gantry mechanism 10. The rigidity of the gantry mechanism 10 indicates a degree of difficulty (or easiness) as to how hardly (or easily) the positions of the entire gantry mechanism 10 (the entire movable portions) change. When the rigidity of the gantry mechanism 10 is relatively high, the positions of the gantry mechanism 10 on the respective Y1 and Y2 axes hardly change, and when the rigidity of the gantry mechanism 10 is relatively low, the positions of the gantry mechanism 10 on the respective Y1 and Y2 axes easily change. It is conceived to determine one of the control modes which is suitable for executing the control, based on the rigidity of the gantry mechanism 10. The mode switching unit 71 may perform a switching between the inter-axis compensation control mode and the separation control mode, based on an evaluation value indicating the degree of rigidity of the gantry mechanism 10.

In an example, the mode switching unit 71 performs a switching to the inter-axis compensation control mode (e.g., selects the inter-axis compensation control mode) when the evaluation value exceeds a predetermined threshold value, and performs a switching to the separation control mode (e.g., selects the separation control mode) when the evaluation value falls below the threshold value. The threshold value is stored in advance in, for example, the motor control system 40, and determined after a relationship between the evaluation value obtained in the past and an execution result in each control mode is verified.

The position acquisition unit 72 acquires information indicating the detected position y1 of the mechanical connector 12 on the Y1 axis from the motor 30A. The position acquisition unit 72 may acquire the value of the detected position y1 from the position detector of the motor 30A, every predetermined period. The position acquisition unit 72 acquires information indicating the detected position y2 of the mechanical connector 12 on the Y2 axis. The position acquisition unit 72 may acquire the value of the detected position y2 from the control device 50B, every predetermined period.

When the mode switching unit 71 performs a switching to the inter-axis compensation control mode, the individual control unit 74 (e.g., a first individual control unit) generates a torque command TcA (e.g., a first command) to the motor 30A, based on the detected position y1 on the Y1 axis and the inter-axis deviation Δy. The individual control unit 74 acquires a position command yt indicating the target position of the mechanical connector 12 in the Y-axis direction, and generates the torque command TcA to reduce the deviation between the detected position y1 and the position command yt (e.g., a target position), and reduce the inter-axis deviation Δy.

The individual control unit 74 operates the motor 30A based on the torque command TcA to the motor 30A. The individual control unit 74 may generate the torque command TcA and operate the motor 30A based on the torque command TcA, every predetermined period. Operating the motor 30A based on the torque command TcA indicates adjusting the value of a driving power (e.g., a driving current) applied to the motor 30A in order to apply the driving force corresponding to the torque command TcA to the Y1 axis of the mechanical connector 12.

When the mode switching unit 71 performs a switching to the separation control mode, the cooperative control unit 76 (e.g., a first cooperative control unit) generates a translational thrust command to both the motors 30A and 30B, based on the detected position y1 on the Y1 axis and the detected position y2 on the Y2 axis. The translational thrust command refers to a command for controlling the position of the mechanical connector 12 in the Y-axis direction (e.g., the position of the center of gravity Cg in the Y-axis direction).

The cooperative control unit 76 may acquire the position command yt indicating the target position of the mechanical connector 12 in the Y-axis direction, and generate the translational thrust command to reduce the deviation between the average value of the detected positions y1 and y2 (e.g., the position Yg described above) and the position command yt. The cooperative control unit 76 outputs the translational thrust command to the control device 50B, and operates the motor 30A based on the translational thrust command and a rotational torque command obtained from the control device 50B. Details of the rotational torque command obtained from the control device 50B will be described later.

The cooperative control unit 76 generates a combined torque command Tc1 to the motor 30A, based on the translational thrust command and the rotational torque command. The cooperative control unit 76 adjusts the value of the driving power (e.g., driving current) applied to the motor 30A, to apply the driving force corresponding to the combined torque command Tc1 to the Y1 axis of the mechanical connector 12. For each predetermined period, the cooperative control unit 76 may generate and output the translational thrust command, and operate the motor 30A based on the translational thrust command and the rotational torque command which are generated in the previous period. In this way, the method of generating (e.g., a calculation method) the torque command to the motor 30A differs between the inter-axis compensation control mode and the separation control mode.

The control device 50B synchronizes with the control device 50A, and adjusts the driving amount applied from the motor 30B to the mechanical connector 12 based on the position command yt from the host controller 60. The control device 50B includes, for example, a mode switching unit 81, a position acquisition unit 82, an individual control unit 84, and a cooperative control unit 86, as functional modules. The processes executed by the respective functional modules correspond to the processes executed by the control device 50B.

The mode switching unit 81 performs a switching between the inter-axis compensation control mode and the separation control mode. For the operation mode of the control device 50B, the mode switching unit 81 selects either the inter-axis compensation control mode or the separation control mode. The control device 50B adjusts the driving amount applied from the motor 30B to the mechanical connector 12, according to the control mode switched (e.g., selected) by the mode switching unit 81. The control device 50B performs a switching to one of the control modes based on, for example, a command indicating the control mode from the host controller 60. The control device 50B may perform a switching to the same control mode as the control mode set in the control device 50A, based on information from the control device 50A (e.g., the mode switching unit 71).

The position acquisition unit 82 acquires information indicating the detected position y2 of the mechanical connector 12 on the Y2 axis from the motor 30B. The position acquisition unit 82 may acquire the value of the detected position y2 from the position detector of the motor 30B, every predetermined period. The position acquisition unit 82 acquires information indicating the detected position y1 of the mechanical connector 12 on the Y1 axis. The position acquisition unit 82 may acquire the value of the detected position y1 from the control device 50A, every predetermined period.

When the mode switching unit 81 performs a switching to the inter-axis compensation control mode, the individual control unit 84 (e.g., a second individual control unit) generates a torque command TcB to the motor 30B, based on the detected position y2 on the Y2 axis and the inter-axis deviation $\Delta y$. The individual control unit 84 acquires the position command yt indicating the target position of the mechanical connector 12 in the Y-axis direction, and generates the torque command TcB to reduce the deviation between the detected position y2 and the position command yt (e.g., a target position), and reduce the inter-axis deviation $\Delta y$.

The individual control unit 84 operates the motor 30B based on the torque command TcB to the motor 30B. The individual control unit 84 may generate the torque command TcB and operate the motor 30B based on the torque command TcB, every predetermined period. The individual control unit 84 adjusts the value of the driving power (e.g., a driving current) applied to the motor 30B, to apply the driving force corresponding to the torque command TcB to the Y2 axis of the mechanical connector 12.

When the mode switching unit 81 performs a switching to the separation control mode, the cooperative control unit 86 (e.g., a second cooperative control unit) generates a rotational torque command to both the motors 30A and 30B based on the inter-axis deviation $\Delta y$. The rotational torque command refers to a command for controlling the rotational state of the mechanical connector 12. The cooperative control unit 86 generates the rotational torque command to reduce the inter-axis deviation $\Delta y$. When the inter-axis deviation $\Delta y$ is reduced, the rotation angle $\theta$ approaches zero. Unlike the cooperative control unit 76 of the control device 50A, the cooperative control unit 86 does not acquire the position command yt indicating the target position.

The cooperative control unit 86 outputs the rotational torque command to the control device 50A, and operates the motor 30B based on the rotational torque command and the translational thrust command obtained from the control device 50A (the cooperative control unit 76). The cooperative control unit 86 generates a combined torque command Tc2 to the motor 30B based on the translational thrust command and the rotational torque command. The cooperative control unit 86 adjusts the value of the driving power (e.g., a driving current) applied to the motor 30B, to apply the driving force corresponding to the combined torque command Tc2 to the Y2 axis of the mechanical connector 12.

For each predetermined period, the cooperative control unit 86 may generate and output the rotational torque command, and operate the motor 30B based on the rotational torque command and the translational thrust command which are generated in the previous period. In this way, the method of generating (e.g., a calculation method) the torque command to the motor 30B differs between the inter-axis compensation control mode and the separation control mode.

In any of the two control modes, the control device 50A adjusts and outputs the driving power applied to the motor 30A, and the control device 50B adjusts and outputs the driving power applied to the motor 30B. In the inter-axis compensation control mode, the control device 50A controls the position on the Y1 axis, and the control device 50B controls the position on the Y2 axis. In each of the position controls performed by the control devices 50A and 50B, a compensation value is added to reduce the inter-axis deviation $\Delta y$.

Figure 4:
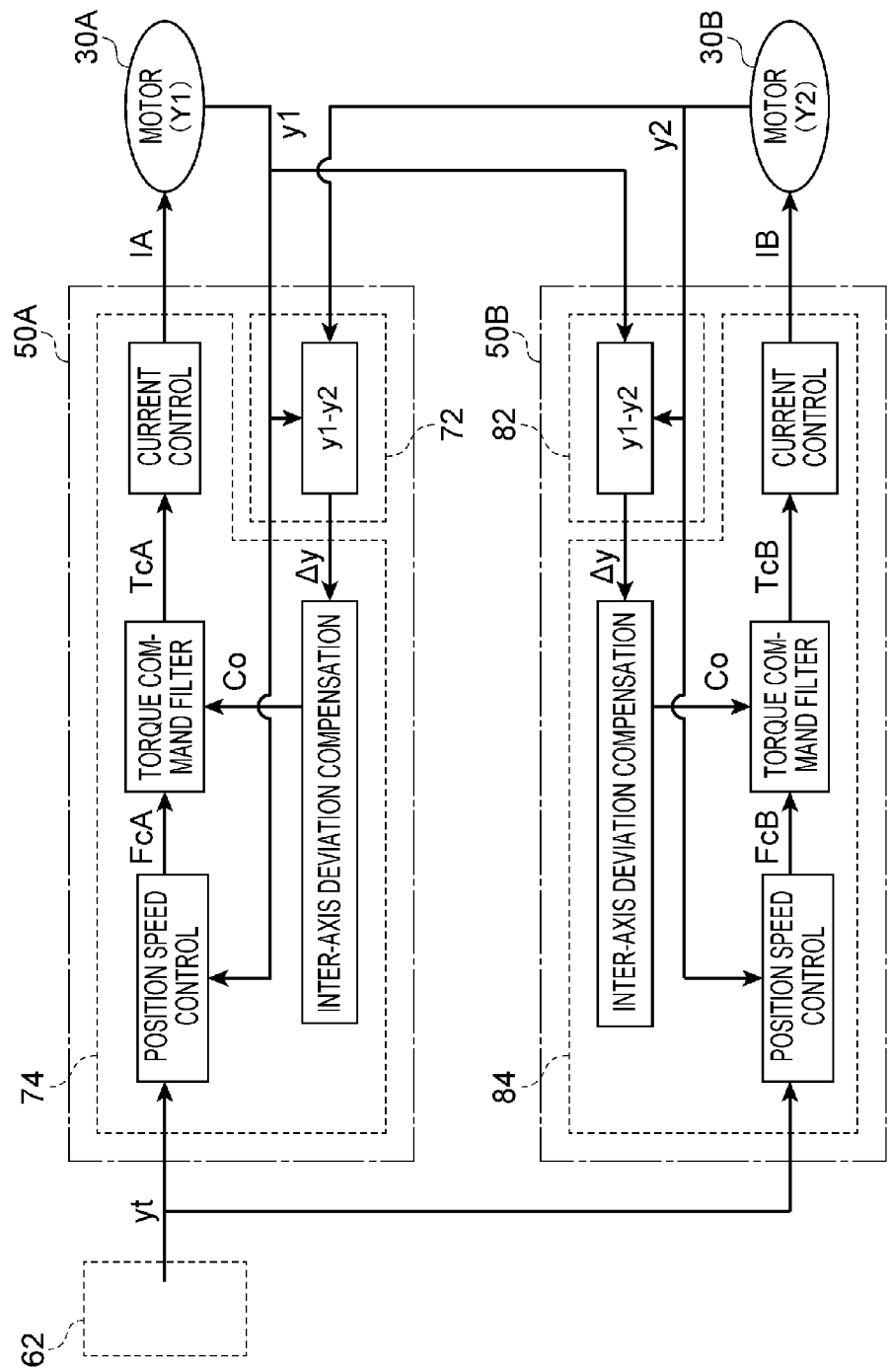
FIG. 4 is a view illustrating an example of control contents in an inter-axis compensation control mode.

FIG. 4 illustrates an example of a data input/output relationship when a switching to the inter-axis compensation control mode is performed. In the control device 50A, the detected position y1 from the motor 30A and the detected position y2 from the motor 30B are input to the position acquisition unit 72. The position acquisition unit 72 calculates the inter-axis deviation $\Delta y$ (=y1−y2) from the detected positions y1 and y2. The position command yt and the detected position y1 are input to the individual control unit 74. Based on the position command yt and the detected position y1, the individual control unit 74 executes a position speed control for making the position of the mechanical connector 12 on the Y1 axis follow the position command yt.

For example, in the position speed control, the individual control unit 74 calculates a positional deviation between the position command yt and the detected position y1, and generates a speed command based on the positional deviation (e.g., by a proportional calculation). Then, the individual control unit 74 calculates a speed deviation between the generated speed command and a speed detection value obtained from the detected position y1, and generates a thrust command FcA based on the speed deviation (by, e.g., a proportional·integral calculation).

The inter-axis deviation Δy is also input to the individual control unit 74. The individual control unit 74 calculates a compensation value Co (e.g., a correction value) of the thrust command to reduce the inter-axis deviation Δy. The individual control unit 74 performs a calculation according to a predetermined filter condition for the thrust command FcA calculated based on the speed deviation and the compensation value Co, thereby generating the torque command TcA described above. The individual control unit 74 outputs a driving current IA corresponding to the torque command TcA to the motor 30A, to operate the motor 30A. As a result, the driving force corresponding to the torque command TcA is applied to the Y1 axis of the mechanical connector 12.

In the control device 50B, the detected position y2 from the motor 30B and the detected position y1 from the motor 30A are input to the position acquisition unit 82. The position acquisition unit 82 calculates the inter-axis deviation Δy from the detected positions y1 and y2. The same position command yt as the position command acquired by the individual control unit 74, and the detected position y2 are input to the individual control unit 84. The individual control unit 84 executes a position speed control for making the position of the mechanical connector 12 on the Y2 axis follow the position command yt, based on the position command yt and the detected position y2.

For example, in the position speed control, the individual control unit 84 calculates a positional deviation between the position command yt and the detected position y2, and generates a speed command based on the positional deviation (by, e.g., a proportional calculation). Then, the individual control unit 84 calculates a speed deviation between the generated speed command and a speed detection value obtained from the detected position y2, and generates a thrust command FcB based on the speed deviation (by, e.g., a proportional·integral calculation).

The inter-axis deviation Δy is also input to the individual control unit 84. The individual control unit 84 calculates a compensation value Co (e.g., a correction value) of the thrust command to reduce the inter-axis deviation Δy. The calculated compensation value Co is the same as the compensation value Co calculated by the individual control unit 74. The individual control unit 84 performs a calculation according to a predetermined filter condition for the thrust command FcB calculated based on the speed deviation and the compensation value Co, thereby generating the torque command TcB described above. As in the example illustrated in FIG. 4, both the individual control unit 74 of the control device 50A and the individual control unit 84 of the control device 50B may calculate the compensation value Co of the thrust command, or unlike the example, either one of the individual control units 74 and 84 may calculate the compensation value Co of the thrust command.

While the compensation value Co is the same between the torque commands TcA and TcB, the filter conditions described above may be set such that the sign of the compensation value Co is inverted. The individual control unit 84 outputs a driving current IB corresponding to the torque command TcB to the motor 30B, to operate the motor 30B. As a result, the driving force corresponding to the torque command TcB is applied to the Y2 axis of the mechanical connector 12.

Meanwhile, in the separation control mode, the control device 50A generates the translational thrust command, and the control devices 50A and 50B adjust the driving powers applied to their corresponding motors, respectively, based on the translational thrust command. Thus, the control device 50A (actually) controls the position of the mechanical connector 12 in the Y-axis direction. In the separation control mode, the control device 50B generates the rotational torque command, and the control devices 50A and 50B adjust the driving powers applied to their corresponding motors, respectively, based on the rotational torque command Thus, the control device 50B (actually) controls the rotation angle θ of the mechanical connector 12.

Figure 5:
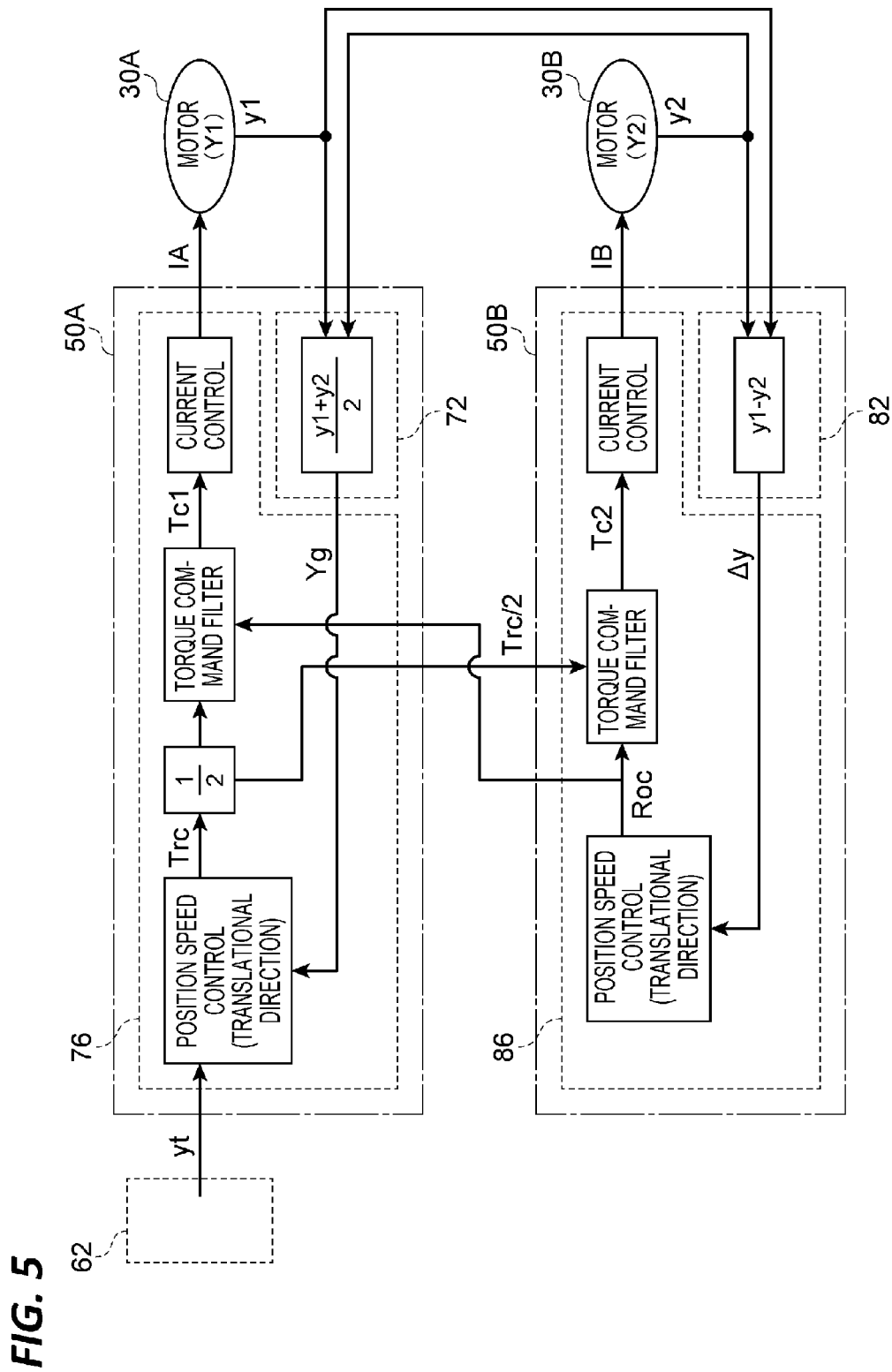
FIG. 5 is a view illustrating an example of control contents in a separation control mode.

FIG. 5 illustrates an example of a data input/output relationship when a switching to the separation control mode is performed. The detected position y1 from the motor 30A and the detected position y2 from the motor 30B are input to the position acquisition unit 72 of the control device 50A. The position acquisition unit 72 calculates the position Yg [=(y1+y2)/2] of the center of gravity Cg of the mechanical connector 12 in the Y-axis direction from the detected positions y1 and y2. The position command yt and the position Yg are input to the cooperative control unit 76. The cooperative control unit 76 executes a position speed control for making the position of the center of gravity of the machine connector 12 follow the position command yt, based on the position command yt and the position Yg.

In the position speed control, the cooperative control unit 76 calculates a translational deviation between the position command yt and the position Yg, and generates a speed command based on the translational deviation (by, e.g., a proportional calculation). Then, the cooperative control unit 76 calculates a speed deviation between the generated speed command and a speed detection value obtained from the position Yg, and generates a translational thrust command Trc indicating a thrust command in the Y-axis direction based on the speed deviation (by, e.g., a proportional·integral calculation). The cooperative control unit 76 outputs a value obtained by halving the translational thrust command Trc, to the cooperative control unit 86 of the control device 50B.

The detected position y2 from the motor 30B and the detected position y1 from the motor 30A are input to the position acquisition unit 82 of the control device 50B. The position acquisition unit 82 calculates the inter-axis deviation Δy from the detected positions y1 and y2. The inter-axis deviation Δy is input to the cooperative control unit 86. Based on the inter-axis deviation Δy, the cooperative control unit 86 executes a position speed control for making the rotation angle θ of the mechanical connector 12 around the vertical axis passing through the center of gravity of the mechanical connector 12 follow zero.

In the position speed control, the cooperative control unit 86 calculates the rotation angle θ from the inter-axis deviation Δy based on Equation (5). The cooperative control unit 86 generates a speed command in the rotation direction based on the value of the rotation angle θ (by, e.g., a proportional calculation). Then, the cooperative control unit 86 calculates a speed deviation between the generated speed command and a speed detection value, in the rotation direction, which is obtained from the rotation angle θ, and generates a rotational torque command Roc indicating a thrust command in the rotation direction based on the speed deviation (by, e.g., a proportional·integral calculation). The cooperative control unit 86 outputs the value of the rotational torque command Roc to the cooperative control unit 76 of the control device 50A.

The cooperative control unit 76 performs a calculation according to a predetermined filter condition for the half value of the translational thrust command Trc and the rotational torque command Roc, thereby generating the combined torque command Tc1 described above. The cooperative control unit 76 outputs a driving current IA corresponding to the combined torque command Tc1 to the motor 30A, to operate the motor 30A. As a result, the driving force corresponding to the combined torque command Tc1 is applied to the Y1 axis of the mechanical connector 12.

The cooperative control unit 86 performs a calculation according to a predetermined filter condition for the half value of the translational thrust command Trc and the rotational torque command Roc, thereby generating the combined torque command Tc2 described above. In the generation of the combined torque command Tc1 and the generation of the combined torque command Tc2, the filter conditions described above may be set such that the sign of the rotational torque command Roc is inverted. The cooperative control unit 86 outputs a driving current IB corresponding to the combined torque command Tc2 to the motor 30B, to operate the motor 30B. As a result, the driving force corresponding to the combined torque command Tc2 is applied to the Y2 axis of the mechanical connector 12.

As illustrated in FIG. 3, the host controller 60 includes, for example, a position command output unit 62, a test control unit 64, and a rigidity evaluation unit 66 as functional modules. The processes executed by the respective functional modules correspond to the processes executed by the host controller 60.

The position command output unit 62 outputs the position command yt indicating the target position of the mechanical connector 12 in the Y-axis direction to each of the control devices 50A and 50B, or outputs the position command yt to the control device 50A without outputting the position command yt to the control device 50B. The position command output unit 62 may output the position command yt to each of the control devices 50A and 50B or to the control device 50A, every predetermined period. The position command output unit 62 may output the position command to each of the control devices 50A and 50B or to the control device 50A, every period, according to a predetermined operation program. The position command output unit 62 may output the position command yt to both control devices 50A and 50B or to the control device 50A, every period, according to, for example, a command from another system.

The test control unit 64 executes an initial setting control for obtaining an index when the control mode is switched. In the initial setting control, the test control unit 64 causes the control devices 50A and 50B to execute the following operation. In the initial setting control, for example, the control device 50A controls the motor 30A to make the detected position y1 follow a test target position, and the control device 50B controls the motor 30B to make the detected position y2 follow a test target position. In the initial setting control, a compensation for reducing the inter-axis deviation Δy is not performed.

The test control unit 64 may cause the control devices 50A and 50B to execute the initial setting control in a predetermined setting period. The test target position may vary in the setting period. During the execution of the initial setting control, the test control unit 64 accumulates (e.g., stores) the inter-axis deviation Δy, a first thrust command, and a second thrust command, every period. The first thrust command is calculated by the control device 50A to make the detected position y1 approach the test target position, and may be calculated in the same manner as that of the thrust command FcA. The second thrust command is calculated by the control device 50B to make the detected position y2 approach the test target position, and may be calculated in the same manner as that of the thrust command FcB.

The rigidity evaluation unit 66 calculates the evaluation value (index) indicating the degree of rigidity of the gantry mechanism 10, based on the inter-axis deviation Δy obtained during the execution of the initial setting control, and a difference between thrust commands to the respective motors 30A and 30B when the inter-axis deviation Δy is obtained. The rigidity evaluation unit 66 may calculate the evaluation value by dividing the inter-axis deviation Δy by the difference between the first and second thrust commands.

For each period, the rigidity evaluation unit 66 may divide the inter-axis deviation Δy in the corresponding period by the difference between the first and second thrust commands in the period. The rigidity evaluation unit 66 may calculate an average value of values obtained by dividing each of the respective inter-axis deviations Δy in a plurality of periods by the difference between the thrust commands, as the evaluation value. The mode switching units 71 and 81 described above may switch the control mode based on the evaluation value calculated by the rigidity evaluation unit 66. At least one of the control devices 50A and 50B may include the rigidity evaluation unit 66.

Figure 6:
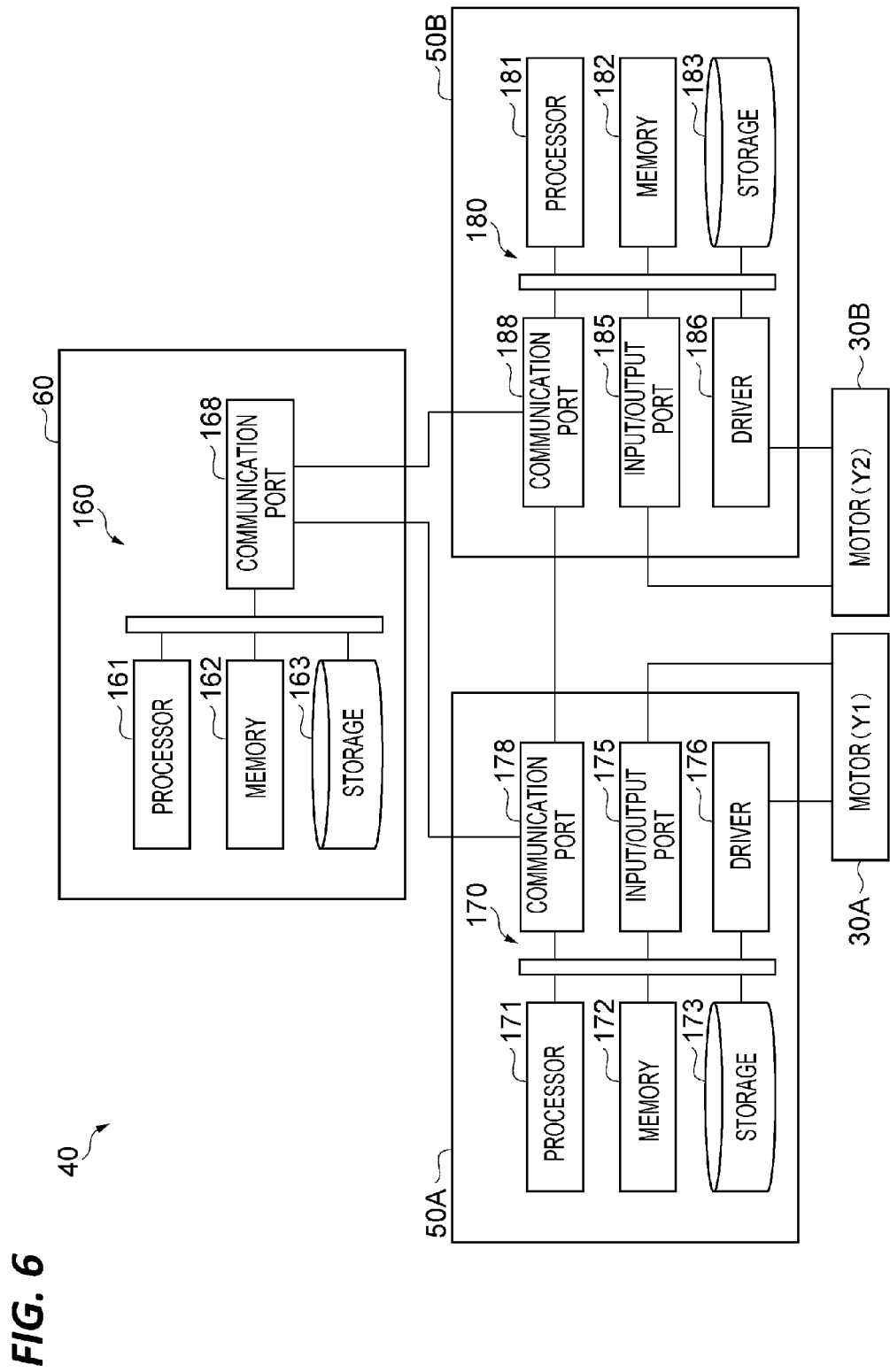
FIG. 6 is a block diagram illustrating an example of a hardware configuration of a motor control system.

As illustrated in FIG. 6, the control device 50A includes circuitries 170. The circuitries 170 include at least one processor 171, a memory 172, a storage 173, an input/output port 175, a driver 176, and a communication port 178. The storage 173 is a computer-readable nonvolatile storage medium (e.g., a flash memory). The storage 173 stores a program and data for controlling the motor 30A in cooperation with the control device 50B. The memory 172 temporarily stores, for example, a program loaded from the storage 173 and the results of a calculation performed by the processor 171.

The processor 171 implements the above-described functional modules of the control device 50A, by executing the above-described program in cooperation with the memory 172. The input/output port 175 performs the input/output of an electric signal to/from the motor 30A (e.g., the position detector of the motor 30A) in response to a command from the processor 171. The driver 176 outputs the driving power (e.g., a driving current) to the motor 30A in response to a command from the processor 171. The communication port 178 communicates with the host controller 60 and the control device 50B via a wireless network, a wired network, or a network line in response to a command from the processor 171.

The control device 50B includes circuitries 180. The circuitries 180 include at least one processor 181, a memory 182, a storage 183, an input/output port 185, a driver 186, and a communication port 188. The storage 183 is a computer-readable nonvolatile storage medium (e.g., a flash memory). The storage 183 stores a program and data for controlling the motor 30B in cooperation with the control device 50A. The memory 182 temporarily stores, for example, a program loaded from the storage 183 and results of a calculation performed by the processor 181.

The processor 181 implements the above-described functional modules of the control device 50B, by executing the above-described program in cooperation with the memory 182. The input/output port 185 performs the input/output of an electric signal to/from the motor 30B (e.g., the position detector of the motor 30B) in response to a command from the processor 181. The driver 186 outputs the driving power (driving current) to the motor 30B in response to a command from the processor 181. The communication port 188 communicates with the host controller 60 and the control device 50A via a wireless network, a wired network, or a network line in response to a command from the processor 181.

The host controller 60 includes circuitries 160. The circuitries 160 include at least one processor 161, a memory 162, a storage 163, and a communication port 168. The storage 163 is a computer-readable nonvolatile storage medium (e.g., a flash memory). The storage 163 stores a program and data for controlling the motors 30A and 30B via the control devices 50A and 50B. The memory 162 temporarily stores, for example, a program loaded from the storage 163, and results of a calculation performed by the processor 161.

The processor 161 implements the above-described functional modules of the host controller 60, by executing the above-described program in cooperation with the memory 162. The communication port 168 communicates with the control devices 50A and 50B via a wireless network, a wired network, or a network line in response to a command from the processor 161. The circuit provided in each of the control devices 50A and 50B and the host controller 60 may not necessarily be limited to the circuit in which the respective functions are implemented by the program. Any one of the circuits may implement at least a portion of the functions by dedicated logic circuits or an application specific integrated circuit (ASIC) which is an integration of the logic circuits.

[Control Method]

Next, descriptions will be made on an example of a control method executed by the motor control system 40 for the motors 30A and 30B. The control method includes at least controlling the motors 30A and 30B, and performing a switching between the inter-axis compensation control mode and the separation control mode. Controlling the motors 30A and 30B includes controlling the motors 30A and 30B according to the switched mode.

Figure 7:
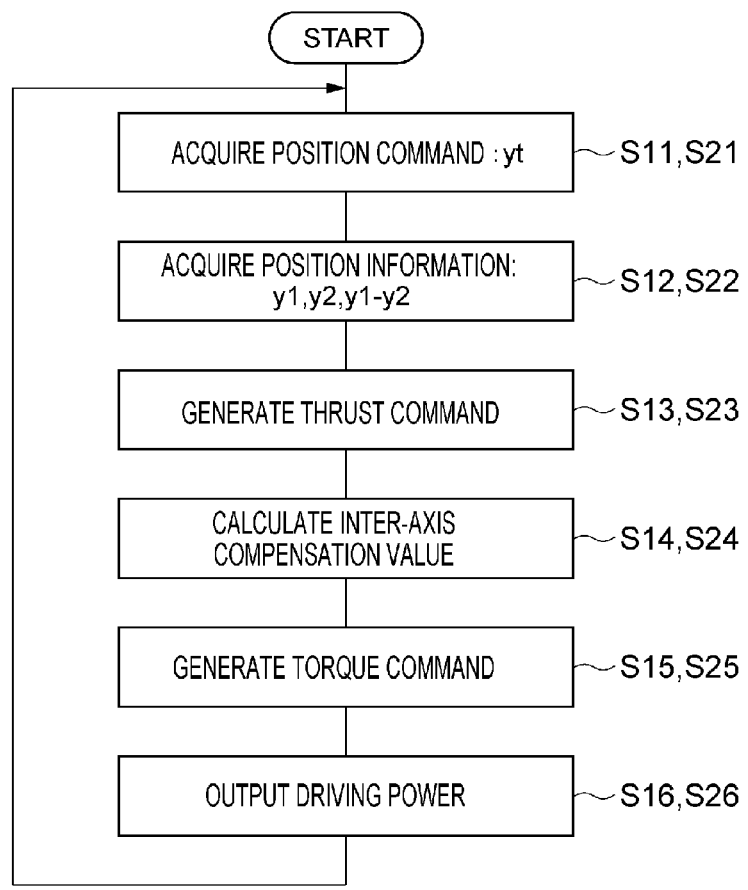
FIG. 7 is a flowchart illustrating an example of a series of processes executed by each control device in the inter-axis compensation control mode.

FIG. 7 illustrates an example of a series of processes executed by the motor control system 40, in one period, when a switching to the inter-axis compensation control mode is performed. Hereinafter, the individual control for each of the motors 30A and 30B in the inter-axis compensation control mode will be described in turn. When the inter-axis compensation control mode is selected, the motor control system 40 repeats a series of processes including steps S11 to S16 described herein below, per predetermined period. Here, the current period is represented as "k" ("k" is an integer of 1 or more), and a value and a command obtained in the k-th period are represented as "Y(k)" and a "command (k)," respectively.

As for the control of the motor 30A, the motor control system 40 first executes step S11. In step S11, for example, the individual control unit 74 of the control device 50A acquires a position command yt(k) from the position command output unit 62 of the host controller 60. The value of the position command yt(k) may be the same as or different from that of a position command yt(k−1) obtained in the previous period.

Next, the motor control system 40 executes step S12. In step S12, for example, the position acquisition unit 72 of the control device 50A acquires a detected position y1(k) from the motor 30A, and the detected position y2 from the control device 50B. In consideration of the time required for the communication from the control device 50B to the control device 50A, the detected position y2 obtained from the control device 50B may be a value acquired by the position acquisition unit 82 of the control device 50B (e.g., a detected position y2(k−1)) in the period prior to the current period. The position acquisition unit 72 may calculate a difference between a detected position y1(k−1) acquired in step S12 of the previous period and the detected position y2(k−1) obtained in step S12, as an inter-axis deviation Δy(k−1).

Next, the motor control system 40 executes steps S13 and S14. In step S13, for example, the individual control unit 74 calculates a positional deviation between the position command yt(k) obtained in step S11 and the detected position y1(k) obtained in step S12. The individual control unit 74 may calculate a positional deviation between the position command yt(k) obtained in step S11 and the detected position y1(k−1) obtained in step S12 of the previous period. Then, based on the calculated positional deviation, the individual control unit 74 generates the thrust command FcA to make the detected position y1 approach the position command yt. In step S14, for example, the individual control unit 74 calculates the compensation value Co of the thrust command to make the inter-axis deviation Δy approach zero, based on the inter-axis deviation Δy(k−1) obtained in step S12.

Next, the motor control system 40 executes steps S15 and S16. In step S15, for example, the individual control unit 74 corrects the thrust command obtained in step S13 with the compensation value obtained in step S14 according to a predetermined filter condition, thereby generating the torque command TcA. In step S16, for example, the individual control unit 74 outputs the driving power (e.g., a driving current) corresponding to the torque command TcA obtained in step S15 to the motor 30A. The motor control system 40 repeats steps S11 to S16 as described above, so that the inter-axis deviation Δy is reduced, and the detected position y1 of the mechanical connector 12 on the Y1 axis follows the position command yt.

When the inter-axis compensation control mode is selected, the motor control system 40 repeats a series of processes including steps S21 to S26 described herein below in a predetermined period. Steps S21 to S26 are executed in the same manner as that of steps S11 to S16, except that the control target in steps S21 to S26 is the motor 30B. The motor control system 40 first executes step S21. In step S21, for example, the individual control unit 84 of the control device 50B acquires the position command yt(k) from the position command output unit 62 of the host controller 60.

Next, the motor control system 40 executes step S22. In step S22, for example, the position acquisition unit 82 of the control device 50B acquires a detected position y2(k) from the motor 30B and the detected position y1(k−1) from the control device 50A. The position acquisition unit 82 may calculate a difference between the detected position y1(k−1) obtained in step S22 and a detected position y2(k−1) acquired in step S22 of the previous period, as an inter-axis deviation Δy(k−1).

Next, the motor control system 40 executes steps S23 and S24. In step S23, for example, the individual control unit 84 calculates a positional deviation between the position command yt obtained in step S21 and the detected position y2(k) obtained in step S22 of the corresponding period or the detected position y2(k−1) obtained in step S22 of the previous period. Then, based on the calculated positional deviation, the individual control unit 84 generates the thrust command FcB for making the detected position y2 approach the position command yt. In step S24, for example, the individual control unit 84 calculates the compensation value Co of the thrust command to make the inter-axis deviation Δy approach zero, based on the inter-axis deviation Δy(k−1) obtained in step S22.

Next, the motor control system 40 executes steps S25 and S26. In step S25, for example, the individual control unit 84 corrects the thrust command FcB obtained in step S23 with the compensation value Co obtained in step S24 according to a predetermined filter condition, thereby generating the torque command TcB. In step S26, for example, the individual control unit 84 outputs the driving power (e.g., a driving current) corresponding to the torque command TcB obtained in step S25 to the motor 30B. The motor control system 40 repeats steps S21 to S26, so that the inter-axis deviation Δy is reduced, and the detected position y2 of the mechanical connector 12 on the Y2 axis follows the position command yt.

Figure 8:
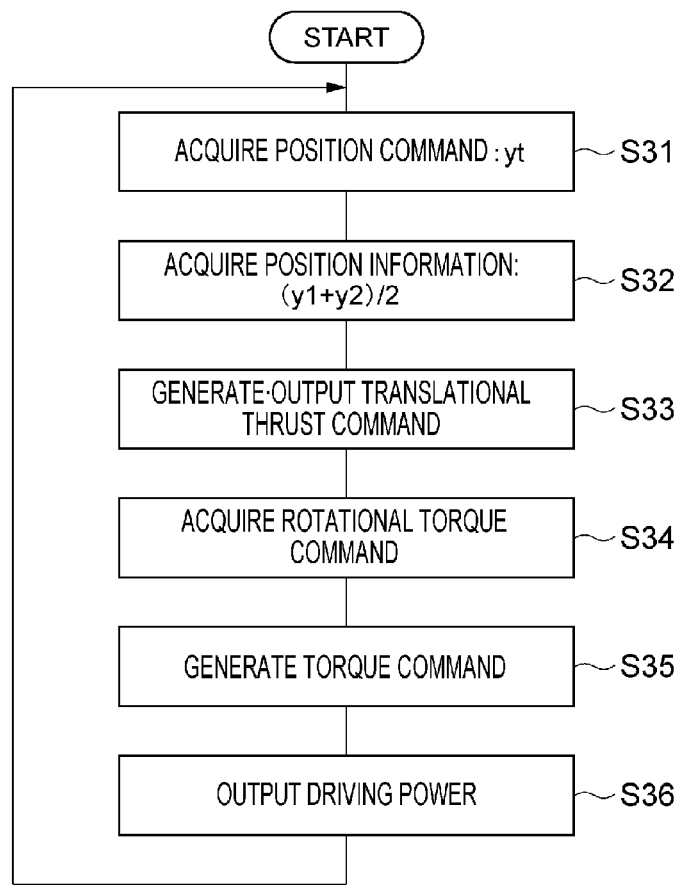
FIG. 8 is a flowchart illustrating an example of a series of processes executed by one side of control devices in the separation control mode.

FIG. 8 illustrates an example of a series of processes executed by the motor control system 40 for the control in the translation direction, in one cycle, when a switching to the separation control mode is performed. For the control in the translational direction, the motor control system 40 first performs step S31. In step S31, for example, the cooperative control unit 76 of the control device 50A acquires the position command yt(k) from the position command output unit 62 of the host controller 60.

Next, the motor control system 40 executes step S32. In step S32, for example, the position acquisition unit 72 of the control device 50A acquires the detected position y1(k) from the motor 30A and the detected position y2(k−1) from the control device 50B. The position acquisition unit 72 may calculate an average value of the detected positions y1(k−1) and y2(k−1), as a position Yg(k−1) of the mechanical connector 12 at the center of gravity Cg.

Next, the motor control system 40 executes step S33. In step S33, for example, the cooperative control unit 76 of the control device 50A calculates a deviation between the position Yg(k−1) and the position command y(k), and generates a translational thrust command Trc(k) to make the position Yg approach the position command yt, based on the deviation. Then, the cooperative control unit 76 halves the value of the generated translational thrust command Trc(k), and thereafter, outputs the half value to the cooperative control unit 86 of the control device 50B.

Next, the motor control system 40 executes step S34. In step S34, for example, the cooperative control unit 76 acquires the rotational torque command from the cooperative control unit 86 of the control device 50B. In consideration of the time required for the communication from the control device 50B to the control device 50A, the rotational torque command acquired in step S34 may be a rotational torque command Roc(k−1) generated by the cooperative control unit 86 in the previous period.

Next, the motor control system 40 executes steps S35 and S36. In step S35, for example, the cooperative control unit 76 generates the combined torque command Tc1 based on the half value of the translational thrust command Trc(k−1) generated in step S33 of the previous period and the rotational torque command Roc(k−1) acquired in step S34. The combination of the half value of the translational thrust command Trc(k−1) and the rotational torque command Roc(k−1) is executed according to a predetermined filter condition. In step S36, for example, the cooperative control unit 76 outputs the driving power (e.g., a driving current) corresponding to the combined torque command Tc1 obtained in step S35 to the motor 30A.

Figure 9:
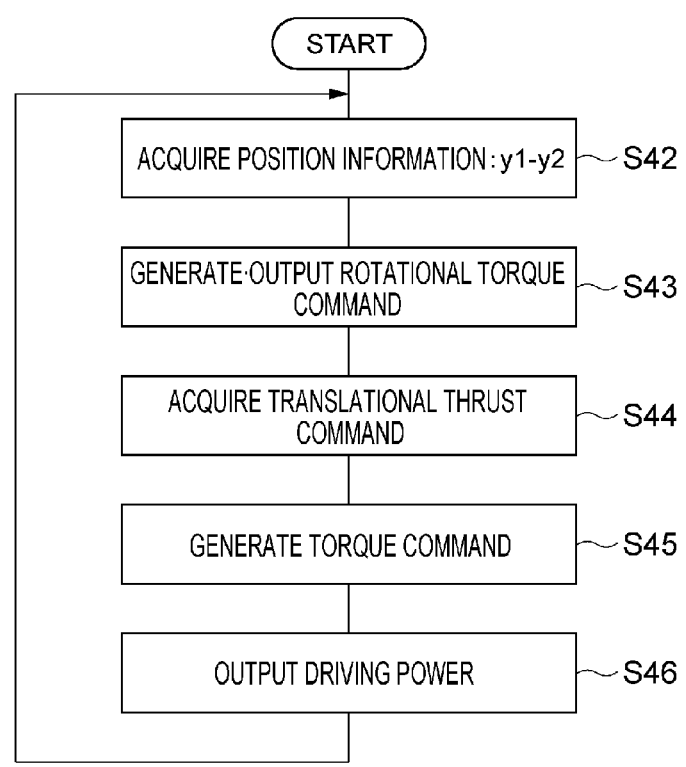
FIG. 9 is a flowchart illustrating an example of a series of processes executed by the other side control device in the separation control mode.

FIG. 9 illustrates an example of a series of processes executed by the motor control system 40 for the control in the rotation direction, in one cycle, when a switching to the separation control mode is performed. For the control in the rotation direction, the motor control system 40 first executes step S42. In step S42, for example, the position acquisition unit 82 of the control device 50B acquires the detected position y2(k) from the motor 30B and the detected position y1(k−1) from the control device 50A. The position acquisition unit 72 calculates a difference between the detected position y1(k−1) and the detected position y2(k−1), as the inter-axis deviation Δy(k−1).

Next, the motor control system 40 executes step S43. In step S43, for example, the cooperative control unit 86 of the control device 50B generates a rotational torque command Roc(k) to reduce the inter-axis deviation Δy, based on the inter-axis deviation Δy(k−1) calculated in step S42. Then, the cooperative control unit 86 outputs the generated rotational torque command Roc(k) to the cooperative control unit 76 of the control device 50A.

Next, the motor control system 40 executes step S44. In step S44, for example, the cooperative control unit 86 acquires the half value of the translational thrust command Trc from the cooperative control unit 76 of the control device 50A. In consideration of the time required for the communication from the control device 50A to the control device 50B, the half value of the translational thrust command acquired in step S44 may be the half value of the translational thrust command Trc(k−1) generated by the cooperative control unit 76 in the previous period.

Next, the motor control system 40 executes steps S45 and S46. In step S45, for example, the cooperative control unit 86 generates the combined torque command Tc2 based on the rotational torque command Roc(k−1) generated in step S43 of the previous cycle and the half value of the translational thrust command Trc(k−1) acquired in step S44. The composition of the rotational torque command Roc(k−1) and the half value of the translational thrust command Trc(k−1) is executed according to a predetermined filter condition. In step S46, for example, the cooperative control unit 86 outputs the driving power (e.g., a driving current) corresponding to the combined torque command Tc2 obtained in step S45 to the motor 30B.

The motor control system 40 repeats steps S31 to S36 and S42 to S46 as described above, so that the inter-axis deviation Δy is reduced, and the position Yg of the mechanical connector 12 at the center of gravity Cg follows the position command yt. In the example described above, the driving power applied to each motor is adjusted based on the rotational torque command Roc(k−1) and the translational thrust command Trc(k−1) that are generated in the previous period. Since the rotational torque command and the translational thrust command are generated based on the detected positions y1(k−1) and y2(k−1) obtained in the period prior to the previous period, the driving power applied to each motor in the current period is adjusted based on the detected positions y1 and y2 obtained two periods before.

Figure 10:
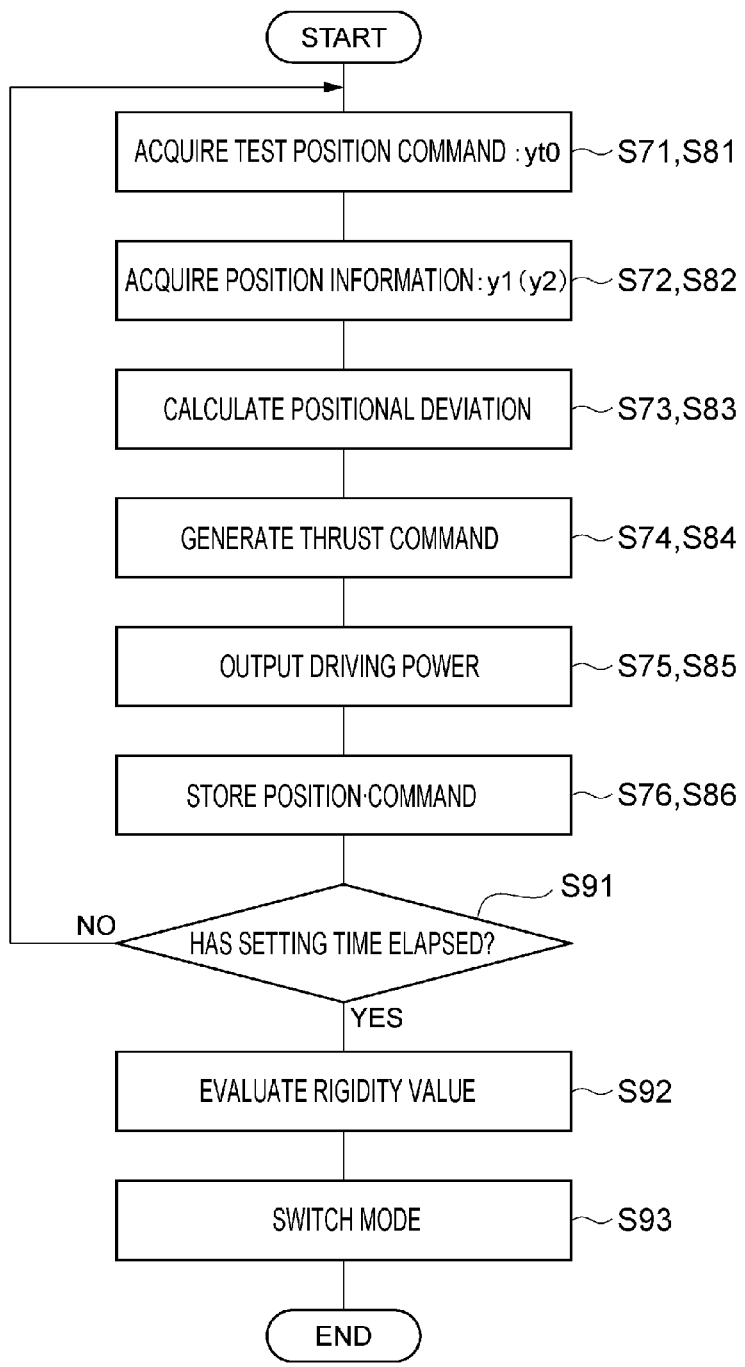
FIG. 10 is a flowchart illustrating an example of a mode switching method.

FIG. 10 is a flowchart illustrating an example of a series of processes executed by the motor control system 40 in the initial setting control described above. The initial setting control is executed for setting the motor control system 40 at a preparatory stage before the gantry drive system 1 performs an actual work (e.g., a work at a manufacturing stage) on the work W. In the initial setting control, for example, the test control unit 64 of the host controller 60 causes the control device 50A to execute steps S71 to S76 described below, and causes the control device 50B to execute steps S81 to S86 described below in synchronization with steps S71 to S76.

Steps S71 to S76 and S81 to S86 are executed in the same manner, except that the motors to be controlled are different. Thus, hereinafter, steps S71 to S76 will be described, and detailed descriptions of steps S81 to S86 will be omitted. The control device 50A repeats steps S71 to S76 until a predetermined condition is satisfied. In step S71, for example, the control device 50A acquires a test position command yt0 (test target position) from the host controller 60.

In step S72, for example, the control device 50A acquires the detected position y1 from the motor 30A. In step S73, for example, the control device 50A calculates a positional deviation between the position command yt0 acquired in step S71 and the detected position y1 acquired in step S72. In step S74, for example, the control device 50A generates a thrust command to reduce the deviation, based on the positional deviation calculated in step S73. In step S75, for example, the control device 50A adjusts the driving power applied to the motor 30A according to the thrust command generated in step S74. In step S76, for example, the control device 50A outputs the detected position y1 acquired in step S72 and the thrust command generated in step S74 to the host controller 60. The host controller 60 stores the detected position y1 and the thrust command in association with information indicating the corresponding period.

After steps S76 and S86 are executed in each period, the motor control system 40 executes step S91. In step S91, for example, the test control unit 64 determines whether a predetermined setting time has elapsed after steps S71 and S81 are started for the first time. The predetermined setting time is set to, for example, a time during which data are accumulated to the extent that the rigidity of the gantry mechanism 10 may be evaluated. When it is determined in step S91 that the predetermined setting time has not elapsed (step S91: NO), the control device 50A executes steps S71 to S76 again, and the control device 50B executes steps S81 to S86 again.

When it is determined in step S91 that the predetermined setting time has elapsed (step S91: YES), the motor control system 40 executes step S92. In step S92, for example, the rigidity evaluation unit 66 calculates the evaluation value indicating the degree of rigidity of the gantry mechanism 10, based on the data accumulated by repeating steps S76 and S86. For each period, the rigidity evaluation unit 66 may divide the difference between the detected positions (e.g., an inter-axis deviation $\Delta y$) obtained in steps S72 and S82 by the difference between the thrust commands obtained in steps S74 and S84. Then, the rigidity evaluation unit 66 may acquire a statistical value of the divided values, such as an average value, a minimum value, a maximum value, or a most frequent value, as the evaluation value.

Next, the motor control system 40 executes step S93. In step S93, for example, the mode switching unit 71 switches the control mode to be executed, to either the inter-axis compensation control mode or the separation control mode, based on the evaluation value acquired in step S92. The mode switching unit 81 may switch the control mode to be executed, to either the inter-axis compensation control mode or the separation control mode, by acquiring a result of the switching performed by the mode switching unit 71. In this manner, the setting at the preparatory stage is completed, and thereafter, the motor control system 40 controls the motors 30A and 30B according to the switched control mode at an actual manufacturing stage.

Modifications

The series of processes described in each of FIGS. 7 to 10 are merely an example, and may be appropriately modified. In the series of processes in any one of FIGS. 7 to 10, the motor control system 40 may execute one step and its subsequent step in parallel, or may execute each step in a different order from that in the example described above. The motor control system 40 may omit any one step, or may execute a different process from the example described above in any one step.

The motor control system 40 may acquire the evaluation value indicating the degree of rigidity of the gantry mechanism 10, by a method other than the initial setting control described above. The motor control system 40 may acquire, for example, the evaluation value calculated by another device from the corresponding device, or may acquire the evaluation value through a user input indicating the evaluation value. Unlike the example described above, the host controller 60 may include a mode switching unit, and the mode switching units 71 and 81 may switch the control mode according to a result of the switching by the mode switching unit of the host controller 60.

The motor control system 40 may switch the control mode by a method different from the switching method based on the evaluation value indicating the degree of rigidity of the gantry mechanism 10. The motor control system 40 may switch the control mode through, for example, a user input indicating a designation of a control mode. The motor control system 40 may switch the control mode according to the driving state of the mechanical connector 12 (e.g., whether the mechanical connector 12 is accelerating) at the stage of an actual work by the gantry drive system 1.

The individual control unit 84 of the control device 50B may acquire the result of compensation value calculation by the individual control unit 74 of the control device 50A, when the compensation value of the thrust command based on the inter-axis deviation $\Delta y$ is not calculated. The individual control unit 74 of the control device 50A may acquire the result of compensation value calculation by the individual control unit 84 of the control device 50B, when the compensation value of the thrust command based on the inter-axis deviation $\Delta y$ is not calculated. The control device 50A may be connected to the motor 30B, or the control device 50B may be connected to the motor 30A. The control devices 50A and 50B may be the same type of control devices, or may be configured to implement the same function. In this case, a control device connected to the motor 30A may function as the control device 50A, and a control device connected to the motor 30B may function as the control device 50B.

The motor control system 40 may include a single control device (e.g., a control unit) having the functions of both control devices 50A and 50B, instead of the control devices 50A and 50B. In the motor control system 40 (e.g., a control unit), unlike the example described above, the control devices 50A and 50B and the host controller 60 may be configured in an integrated form. A single program (e.g., a control program) for implementing the functional modules provided in the control devices 50A and 50B and the host controller 60 may be stored in a single storage medium.

Effects of Embodiment

The drive system 20 described above includes the motor 30A that drives the gantry mechanism 10 (e.g., the mechanical connector 12) along the Y1 axis, the motor 30B that drives the gantry mechanism 10 along the Y2 axis, and the motor control system 40 that controls the motors 30A and 30B. The motor control system 40 includes the mode switching units 71 and 81 that perform a switching between the inter-axis compensation control mode for individually controlling the position of the gantry mechanism 10 while reducing the inter-axis deviation Δy between the Y1 and Y2 axes, and the separation control mode for controlling the rotational state of the gantry mechanism 10 while controlling the position of the gantry mechanism 10, based on the detected positions on the Y1 and Y2 axes. The motor control system 40 controls the motors 30A and 30B according to the mode switched by the mode switching units 71 and 81.

In the inter-axis compensation control mode and the separation control mode, for example, the magnitude of the control gain and the degree of suppression of the inter-axis deviation Δy at the time of each control differ between the modes. The gantry drive system 1 may control the motors 30A and 30B in any one of the two control modes. Thus, each motor may be controlled in any one of the control modes, according to the characteristics of the gantry mechanism 10. In many cases, the gantry mechanism 10 needs to be actually operated to grasp the characteristics of the gantry mechanism 10. In the configuration described above, it is possible to eliminate the time for preparing a control system capable of executing a control suitable for the characteristics of the gantry mechanism 10 which is the driving object. Thus, the setting work may be simplified.

The mode switching units 71 and 81 may perform a switching between the inter-axis compensation control mode and the separation control mode, based on the evaluation value indicating the degree of rigidity of the gantry mechanism 10. The allowable control gain may differ according to the mechanical characteristics of the gantry mechanism 10. By switching the control mode based on the evaluation value as described above, the motors may be controlled in the control mode corresponding to the mechanical characteristics of the gantry mechanism 10. Thus, the stability of the control is ensured.

The mode switching units 71 and 81 may perform a switching to the inter-axis compensation control mode when the evaluation value exceeds a predetermined threshold value, and may perform a switching to the separation control mode when the evaluation value falls below the threshold value. In the separation control mode, since the rotational torque command is reflected in each of the driving forces from the motors 30A and 30B, to control the rotational state of the gantry mechanism 10, the inter-axis deviation Δy may be further reduced. In the inter-axis compensation control mode, since the driving powers are output to the motors with the compensation value added to the commands for the position control, the inter-axis deviation Δy tends to be reduced to a small extent. By comparing the evaluation value and the threshold value as described above, the motors 30A and 30B may be controlled in the control mode suitable for the rigidity of the gantry mechanism 10.

The motor control system 40 may further include the test control unit 64 that executes the initial setting control for controlling the motors 30A and 30B to make the detected position y1 on the Y1 axis and the detected position y2 on the Y2 axis follow the test target position, and the rigidity evaluation unit 66 that calculates the evaluation value based on the inter-axis deviation Δy obtained during the execution of the initial setting control and the difference between the thrust commands to the motors 30A and 30B when the inter-axis deviation Δy is obtained. For example, it may also be conceived that at the preparatory stage of the gantry drive system 1, an operator or the like selects the control mode suitable for the gantry mechanism 10 to be actually used, based on trials and errors or experience. In this case, the operator needs to observe and determine various state quantities in the gantry mechanism 10, which requires a large amount of labor, and further, requires operator's experience in order to make an appropriate determination. In the configuration described above, the motor control system 40 may automatically select the control mode. Thus, the labor of the operator at the preparatory stage may be reduced, and even an inexperienced operator may easily make an appropriate selection. Therefore, the setting work may be further simplified.

The motor control system 40 may include the control device 50A connected to the motor 30A and the control device 50B connected to the motor 30B. The control devices 50A and 50B may be connected to each other for a communication. In the inter-axis compensation control mode, the control device 50A may generate a command to the motor 30A based on the detected position y1 on the Y1 axis, and the control device 50B may generate a command to the motor 30B based on the detected position y2 on the Y2 axis. In the inter-axis compensation control mode, at least one of the control devices 50A and 50B may generate the compensation values of the commands to the motors 30A and 30B based on the inter-axis deviation Δy. In the separation control mode, the control device 50A may generate commands to the motors 30A and 30B based on the detected position y1 on the Y1 axis and the detected position y2 on the Y2 axis, and the control device 50B may generate commands to the motors 30A and 30B based on the inter-axis deviation Δy. In this case, the gantry mechanism 10 may be driven in either the control mode for executing the position control in units of each of the Y1 and Y2 axes, or the control mode for executing the position control and the rotational position control by separating the unit for controlling the gantry mechanism 10 into the translational control unit and the rotational control unit. Thus, the gantry mechanism 10 may be driven in the control mode suitable for the characteristics of the gantry mechanism 10. Therefore, the gantry mechanism 10 may be operated with a high accuracy.

The control device 50A may include the individual control unit 74 that generates the torque command TcA to the motor 30A based on the detected position y1 on the Y1 axis and the inter-axis deviation Δy in the inter-axis compensation control mode, and the cooperative control unit 76 that generates the translational thrust command Trc to the motors 30A and 30B based on the detected positions y1 and y2 in the separation control mode. The control device 50B may include the individual control unit 84 that generates the torque command TcB to the motor 30B based on the detected position on the Y2 axis and the inter-axis deviation Δy in the inter-axis compensation control mode, and the cooperative control unit 86 that generates the rotational torque command Roc to the motors 30A and 30B based on the inter-axis deviation Δy in the separation control mode. In this case, the position control of the gantry mechanism 10 and the control for reducing the inter-axis deviation Δy may be executed in each of the different control modes.

The individual control unit 74 may operate the motor 30A based on the torque command TcA. The cooperative control unit 76 may output the translational thrust command Trc to the control device 50B, and operate the motor 30A based on the translational thrust command Trc and the rotational torque command Roc obtained from the cooperative control unit 86. The individual control unit 84 may operate the motor 30B based on the torque command TcB. The cooperative control unit 86 may output the rotational torque command Roc to the control device 50A, and operate the motor 30B based on the rotational torque command Roc and the translational thrust command Trc obtained from the cooperative control unit 76. In this case, in the inter-axis compensation control mode, the control of the motors is executed independently in units of each axis, after the detected positions from the respective motors are acquired. Further, in the separation control mode, the control of the motors is executed by the commands generated by the control devices 50A and 50B, respectively. While the transmission/reception of commands are performed between the control devices 50A and 50B in the separation control mode, the transmission/reception of commands are not performed in the inter-axis compensation control mode, so that the responsiveness is high. Thus, the control of the motors may be performed in accordance with the responsiveness required by the gantry mechanism 10.

The control devices 50A and 50B may control the motors 30A and 30B such that the gantry mechanism 10 approaches the target position, thereby reducing the inter-axis deviation $\Delta y$, every predetermined period. The individual control unit 74 may generate the torque command TcA and operate the motor 30A based on the torque command TcA, every predetermined period. The individual control unit 84 may generate the torque command TcB and operate the motor 30B based on the torque command TcB, every predetermined period. In this case, the generation of the commands and the operation to the motors based on the commands are executed in one period, so that the control with a high responsiveness may be implemented. Thus, when it is desired to improve the responsiveness according to the characteristics of the gantry mechanism 10, the control of the motors may be executed in the control mode suitable for the characteristics of the gantry mechanism 10.

The control devices 50A and 50B may control the motors 30A and 30B such that the gantry mechanism 10 approaches the target position, thereby reducing the inter-axis deviation $\Delta y$, every predetermined period. For each predetermined period, the cooperative control unit 76 may generate and output the translational thrust command Trc and operate the motor 30A based on the translational thrust command Trc and the rotational torque command Roc which are generated in the previous period. For each predetermined period, the cooperative control unit 86 may generate and output the rotational torque command Roc, and operate the motor 30B based on the translational thrust command Trc and the rotational torque command Roc which are generated in the previous period. In this case, the control devices may generate the command for the translation of one pair of motors and the command for the rotation, respectively.

The individual control unit 74 may acquire the position command yt indicating the target position of the gantry mechanism 10, and generate the torque command TcA such that the deviation between the detected position y1 on the Y1 axis and the position command yt is reduced, thereby reducing the inter-axis deviation $\Delta y$. The individual control unit 84 may acquire the position command yt, and generate the torque command TcB such that the deviation between the detected position y2 on the Y2 axis and the position command yt is reduced, thereby reducing the inter-axis deviation $\Delta y$. In this case, in the inter-axis compensation control mode, the position control for making the gantry mechanism 10 follow the target position is performed, so that the occurrence of twist between the Y1 and Y2 axes may be suppressed.

The cooperative control unit 76 may acquire the position command yt indicating the target position of the gantry mechanism 10, and generate the translational thrust command Trc to reduce the deviation between the average value of the detected positions y1 and y2 (e.g., position Yg) and the position command yt. The cooperative control unit 86 may generate the rotational torque command Roc to reduce the inter-axis deviation $\Delta y$. In this case, in the separation control mode, the state of the gantry mechanism 10 in the rotation direction is controlled while making the gantry mechanism 10 follow the target position, so that the occurrence of twist between the Y1 and Y2 axes may be suppressed.

According to the present disclosure, it is possible to provide a gantry drive system, a motor control system, a control method, and a control program which are useful for simplifying a setting work.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A gantry drive system comprising:
 a first motor configured to drive a driving object along a first axis;
 a second motor configured to drive the driving object along a second axis parallel with the first axis; and
 a motor control system configured to control the first and second motors,
 wherein the motor control system includes a mode switch that performs a switching between a first control mode in which a position of the driving object on each of the first and second axes is individually controlled while reducing an inter-axis positional deviation between the first and second axes, the inter-axis positional deviation being a deviation between the position of the driving object on the first axis and the position of the driving object on the second axis, and a second control mode in which a rotational state of the driving object is controlled while controlling a position of the driving object, based on detected positions of the driving object on the first and second axes, and
 the motor control system controls the first and second motors according to the control mode switched by the mode switch.

2. The gantry drive system according to claim 1, wherein the mode switch switches the first and second control modes based on an evaluation value indicating a degree of rigidity of the driving object.

3. The gantry drive system according to claim 2, wherein the mode switch performs a switching to the first control mode when the evaluation value exceeds a predetermined threshold value, and performs a switching to the second control mode when the evaluation value falls below the predetermined threshold value.

4. The gantry drive system according to claim 2, wherein the motor control system further includes
 a test controller configured to execute an initial setting control for the first and second motors to make the detected positions on the first and second axes follow a test target position, and
 a rigidity evaluator configured to calculate the evaluation value based on the inter-axis positional deviation obtained during the execution of the initial setting control, and a difference between thrust commands to the first and second motors, respectively, when the inter-axis positional deviation is obtained.

5. The gantry drive system according to claim 1, wherein the motor control system includes a first control device connected to the first motor, and a second control device connected to the second motor,
the first and second control devices are connected to each other for a communication,
in the first control mode, the first control device generates a command directed to the first motor based on the detected position on the first axis, and the second control device generates a command directed to the second motor based on the detected position on the second axis,
in the first control mode, at least one of the first and second control devices generates compensation values of the commands directed to the first and second motors based on the inter-axis positional deviation, and
in the second control mode, the first control device generates a command directed to the first and second motors based on the detected positions on the first and second axes, and the second control device generates a command directed to the first and second motors based on the inter-axis positional deviation.

6. The gantry drive system according to claim 5, wherein the first control device includes
a first individual controller configured to generate a first command directed to the first motor based on the detected position on the first axis and the inter-axis positional deviation, in the first control mode, and
a first cooperative controller configured to generate a translational thrust command directed to the first and second motors based on the detected positions on the first and second axes, in the second control mode, and
the second control device includes
a second individual controller configured to generate a second command directed to the second motor based on the detected position on the second axis and the inter-axis positional deviation, in the first control mode, and
a second cooperative controller configured to generate a rotational torque command directed to the first and second motors based on the inter-axis positional deviation, in the second control mode.

7. The gantry drive system according to claim 6, wherein
the first individual controller operates the first motor based on the first command,
the first cooperative controller outputs the translational thrust command to the second control device, and operates the first motor based on the translational thrust command and the rotational torque command obtained from the second cooperative controller,
the second individual controller operates the second motor based on the second command, and
the second cooperative controller outputs the rotational torque command to the first control device, and operates the second motor based on the rotational torque command and the translational thrust command obtained from the first cooperative controller.

8. The gantry drive system according to claim 6, wherein the first and second control devices control the first and second motors to make the driving object approach a target position, and reduce the inter-axis positional deviation, every predetermined period,
the first individual controller generates the first command and operates the first motor based on the first command, per the predetermined period, and
the second individual controller generates the second command and operates the second motor based on the second command, per the predetermined period.

9. The gantry drive system according to claim 6, wherein the first and second control devices control the first and second motors to make the driving object approach a target position, and reduce the inter-axis positional deviation, every predetermined period,
per the predetermined period, the first cooperative controller generates and outputs the translational thrust command, and operates the first motor based on the translational thrust command and the rotational torque command which are generated in a previous period, and
per the predetermined period, the second cooperative controller generates and outputs the rotational torque command, and operates the second motor based on the translational thrust command and the rotational torque command which are generated in the previous period.

10. The gantry drive system according to claim 6, wherein the first individual controller acquires a position command indicating a target position of the driving object, and generates the first command so as to reduce a deviation between the detected position on the first axis and the position command, and reduce the inter-axis positional deviation, and
the second individual controller acquires the position command, and generates the second command so as to reduce a deviation between the detected position on the second axis and the position command, and reduce the inter-axis positional deviation.

11. The gantry drive system according to claim 6, wherein the first cooperative controller acquires a position command indicating a target position of the driving object, and generates the translational thrust command so as to reduce a deviation between an average value of the detected positions on the first and second axes and the position command, and
the second cooperative controller generates the rotational torque command so as to reduce the inter-axis positional deviation.

12. A motor control system comprising:
a controller configured to control a first motor that drives a driving object along a first axis, and a second motor that drives the driving object along a second axis parallel with the first axis; and
a mode switch configured to perform a switching between a first control mode in which a position of the driving object on each of the first and second axes is individually controlled while reducing an inter-axis positional deviation between the first and second axes, the inter-axis positional deviation being a deviation between the position of the driving object on the first axis and the position of the driving object on the second axis, and a second control mode in which a rotational state of the driving object is controlled while controlling a position of the driving object, based on detected positions of the driving object on the first and second axes,
wherein the controller controls the first and second motors according to the control mode switched by the mode switch.

13. A control method comprising:
controlling a first motor that drives a driving object along a first axis, and a second motor that drives the driving object along a second axis parallel with the first axis; and
performing a switching between a first control mode in which a position of the driving object on each of the first and second axes is individually controlled while reducing an inter-axis positional deviation between the first and second axes, the inter-axis positional deviation being a deviation between the position of the driving object on the first axis and the position of the driving object on the second axis, and a second control mode in which a rotational state of the driving object is controlled while controlling a position of the driving object, based on detected positions of the driving object on the first and second axes, wherein the controlling the first and second motors includes controlling the first and second motors according to a switched control mode.

14. A non-transitory computer-readable storage medium having stored therein a program that causes a computer to execute the control method according to claim 13.

* * * * *

UNITED STATES PATENT AND TRADEMARK OFFICE
CERTIFICATE OF CORRECTION

| | | |
|---|---|---|
| PATENT NO. | : 12,134,546 B2 | Page 1 of 1 |
| APPLICATION NO. | : 17/865816 | |
| DATED | : November 5, 2024 | |
| INVENTOR(S) | : Minoru Koga, Shota Kawahara and Junichi Ito | |

It is certified that error appears in the above-identified patent and that said Letters Patent is hereby corrected as shown below:

On the Title Page

Add item (30) Foreign Application Priority Data July 29, 2021 (JP).......................... 2021-124470

Signed and Sealed this
Tenth Day of December, 2024

*Katherine Kelly Vidal*
Katherine Kelly Vidal
*Director of the United States Patent and Trademark Office*